J. R. McALLISTER.
Running-Gear.
No. 57,745.
Patented Sept. 4, 1866
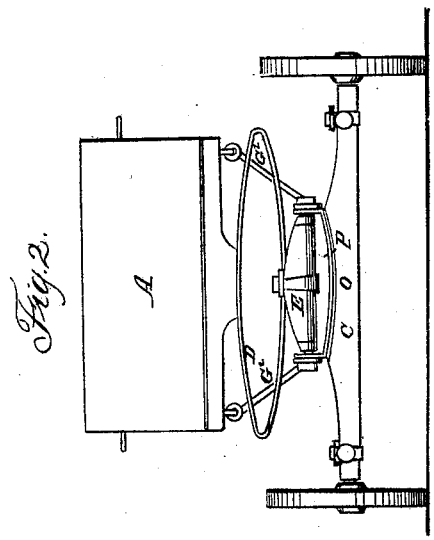
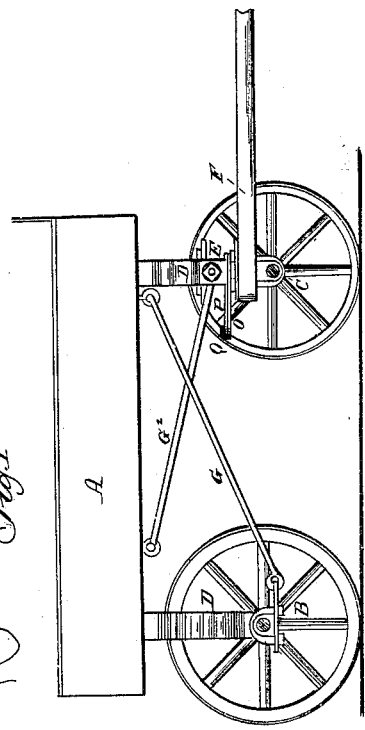

UNITED STATES PATENT OFFICE.

J. R. McALISTER, OF RICHVILLE, NEW YORK.

IMPROVEMENT IN CARRIAGE-GEARING.

Specification forming part of Letters Patent No. 57,745, dated September 4, 1866.

*To all whom it may concern:*

Be it known that I, J. R. McALISTER, of Richville, St. Lawrence county, State of New York, have invented new and useful Improvements in Wagon or Carriage Gearing; and I do hereby declare that the following is a full, clear, and exact description thereof, which will enable others skilled in the art to make and use the same, reference being had to the accompanying drawings, forming part of this specification.

In the present improvements the reach-pole is dispensed with, and the wagon or carriage body is connected with the front and rear axle-trees by means of four or more brace-rods, extending from and hung at one end to its under side, two from the front end of the wagon-body, one upon each side, and the other two from the rear end, which rods are respectively hung, the first two to the rear or hind axle-tree, and the other, or last two, to the outer ends of the head-block, having the front spring secured to it, whereby strength, durability, lightness, and cheapness are secured, and the pitching either forward or backward of the wagon-body is entirely prevented, as will be apparent from the detail description which is to be hereinafter given.

The present invention also consists in a novel manner of hanging the front axle-tree to the head-block of the front wagon-spring, whereby the thills or shafts of the wagon are enabled to be rigidly secured or fastened to the said axle-tree, and yet, when so desired, they can be swung up and into a vertical position, or nearly so, thereby increasing the convenience and facility with which a horse can be harnessed in and to the thills.

In the accompanying plate of drawings my improvements are illustrated, Figure 1 being a side elevation of a wagon with the improvements applied thereto, and Fig. 2 an elevation of the front end of the same.

Similar letters of reference indicate like parts.

A in the drawings represents the wagon-body, B its rear or hind axle-tree, and C its front one, between each of which and the under side of the wagon-body A an elliptic spring, D, is placed, both of which are secured at their upper sides to the wagon-body, and the rear one on its under side to the hind axle-tree, B, but with the front one secured upon its under side to a cross-head or head-block, E, to which, in a novel manner, to be hereinafter explained, the front axle-tree is hung so as to admit of its thills F being swung up or into a vertical position.

G G $G^2$ $G^2$ are four brace-rods, two upon each side of the wagon-body, to the under side or bottom of which they are severally fastened at one end, while two, G G, at their other ends are secured or hung to the hind or rear axle-tree in any proper manner, so as to swing thereon, and the other two, $G^2$ $G^2$, to each end of the head-block E, having the front elliptical spring secured to it, as hereinbefore explained. These brace-rods dispense with the use of a reach-pole for connecting the front and rear axle-trees, and by the manner in which they are arranged, as above explained, and clearly shown in the drawings, prevent the pitching or swinging either backward or forward of the wagon-body, a quite important desideratum; and, furthermore, with the brace-rods no mortising of the axle-tree is required, as is the case when a reach-pole is used, thereby securing the full strength of the axles.

To the upper side or edge of the front axle-tree, C, a circular-shaped plate or frame, O, is secured, corresponding to which is another similar plate or frame, P, hung upon each end of the head-block E, having the front spring attached to it, which two frames, O and P, lie flat upon each other, and the lower one, O, interlocked with the upper one by means of an overlapping piece, Q, upon its rear edge, by means of which their detachment from each other is prevented, and yet the lower one can freely turn or swing upon the upper, so as to allow the front axle-tree to be turned or swung around, as may be desired, the hanging of the upper circle or plate to the head-block enabling—as is obvious from the above description, and by an inspection of the drawings—the thills to be swung up into a vertical position, or nearly so, when desired to harness a horse to them, or for want of surface-room or other reason.

I claim as new and desire to secure by Letters Patent—

1. The brace-rods $G\ G^2$, secured to the wagon-body at one end, and at their others, respectively, to the hind axle-tree and the head-block E of the front spring of the said body, substantially as and for the purpose described.

2. The swinging-frame circle O of the front head-block, E, in combination with the plate or circle P, fixed to the front axle-tree, the two being connected together, substantially as described, and for the purpose specified.

J. R. McALISTER.

Witnesses:
CHARLES R. WALKER,
WM. H. DOANE.